United States Patent
Ma et al.

(10) Patent No.: US 11,461,930 B2
(45) Date of Patent: Oct. 4, 2022

(54) CAMERA CALIBRATION PLATE, CAMERA CALIBRATION METHOD AND DEVICE, AND IMAGE ACQUISITION SYSTEM

(71) Applicants: Beijing BOE Optoelectronics Technology Co., Ltd., Beijing (CN); BOE Technology Group Co., Ltd., Beijing (CN)

(72) Inventors: Fuqiang Ma, Beijing (CN); Hongzhen Xue, Beijing (CN); Lili Chen, Beijing (CN); Hao Zhang, Beijing (CN); Gang Li, Beijing (CN); Minglei Chu, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 359 days.

(21) Appl. No.: 16/739,476

(22) Filed: Jan. 10, 2020

(65) Prior Publication Data

US 2020/0226789 A1 Jul. 16, 2020

(30) Foreign Application Priority Data

Jan. 14, 2019 (CN) .......................... 201910032212.0
Jan. 22, 2019 (CN) .......................... 201910060071.3

(51) Int. Cl.
*H04N 5/225* (2006.01)
*G06T 7/80* (2017.01)
*H04N 5/232* (2006.01)
*G06T 5/00* (2006.01)
*G06T 7/70* (2017.01)

(52) U.S. Cl.
CPC ................ *G06T 7/80* (2017.01); *G06T 5/006* (2013.01); *G06T 7/70* (2017.01); *H04N 5/23238* (2013.01)

(58) Field of Classification Search
CPC .. G06T 7/80; G06T 7/70; G06T 5/006; H04N 5/23238
USPC ...................................................... 348/207.99
See application file for complete search history.

(56) References Cited

U.S. PATENT DOCUMENTS

| | | | |
|---|---|---|---|
| 2004/0169870 A1* | 9/2004 | Ahmed | H04N 1/195 382/284 |
| 2005/0057563 A1* | 3/2005 | Shum | G06T 15/205 345/419 |
| 2007/0252987 A1* | 11/2007 | Cunningham | G01N 33/54373 356/326 |
| 2009/0278966 A1* | 11/2009 | Kusaka | H04N 9/04557 348/294 |
| 2018/0203164 A1* | 7/2018 | Yamamoto | G02B 27/32 |

FOREIGN PATENT DOCUMENTS

CN 107705335 A * 2/2018

* cited by examiner

*Primary Examiner* — Usman A Khan
(74) *Attorney, Agent, or Firm* — Myers Bigel, P.A.

(57) ABSTRACT

A camera calibration plate, a camera calibration method and device, and an image acquisition system are described. The camera calibration plate includes a planar plate body, and a plurality of groups of concentric circles on the planar plate body. The plurality of groups of concentric circles are same and include solid circle center points. The plurality of groups of concentric circles are distributed in an array.

16 Claims, 5 Drawing Sheets

CAMERA CALIBRATION PLATE, CAMERA CALIBRATION METHOD AND DEVICE, AND IMAGE ACQUISITION SYSTEM

RELATED APPLICATIONS

The present application claims the benefits of Chinese Patent Application No. 201910032212.0, filed on Jan. 14, 2019 and Chinese Patent Application No. 201910060071.3, filed on Jan. 22, 2019, the entire disclosures of which are incorporated herein by reference.

TECHNICAL FIELD

The present disclosure relates to the field of image processing technologies, and in particular, to a camera calibration plate, a camera calibration method and device, and an image acquisition system.

BACKGROUND

A wide-angle camera (comprising super wide-angle camera or fish-eye camera) is an image acquisition device with a large angle of view and a short focal length lens. It can capture more scenes in a short shooting distance, and is more suitable for taking pictures of large scenes, such as architecture, scenery and the like. The parameter that measures the camera's wide angle or field of view is the minimum focal length of the lens. Generally, a camera with a lens whose minimum focal length is less than 28 mm is called a wide-angle camera. Generally, the smaller the focal length, the larger the angle of view will be.

Before using a wide-angle camera, the wide-angle camera needs to be calibrated to establish a correspondence between the pixel position in the image captured by the wide-angle camera and the actual scene position. Whether in image measurement or machine vision application, the calibration of camera parameters is a very critical part. The accuracy of the calibration results and the stability of the algorithm directly affect the accuracy of the results produced by the camera.

SUMMARY

According to one aspect of the present disclosure, a camera calibration plate is provided, comprising comprising a planar plate body, a plurality of groups of concentric circles, on the planar plate body, that are same, and solid circle center points of the plurality of groups of concentric circles, the plurality of groups of concentric circles being distributed in an array.

In a camera calibration plate according to some embodiments of the present disclosure, the plurality of groups of concentric circles are arranged at a fixed circle center distance.

According to another aspect of the present disclosure, there is provided a camera calibration method comprising: an initialization step: determining an initial value of a camera parameter using the camera calibration plate of some embodiments of the present disclosure; and an optimization step: optimizing the initial value of the camera parameter in an iterative manner.

In a camera calibration method according to some embodiments of the present disclosure, the initialization step comprises: a calibration image acquisition step: acquiring a calibration image of the camera calibration plate captured by a camera, the calibration image comprising a plurality of groups of elliptical patterns and solid center points of the plurality of groups of elliptical patterns formed by the plurality of groups of concentric circles in the camera calibration plate and solid circle center points of the plurality of groups of concentric circles; an ellipse detection step: extracting in the calibration image, by using an ellipse detection algorithm, a plurality of ellipses respectively corresponding to concentric circles in the plurality of groups of concentric circles in the camera calibration plate, and acquiring parameter information of the plurality of ellipses; an ellipse grouping step: dividing the plurality of ellipses into a plurality of concentric ellipse groups respectively corresponding to the plurality of groups of concentric circles in the camera calibration plate according to parameter information of the plurality of ellipses; a parameter calculation step: calculating parameter information of the plurality of concentric ellipse groups according to parameter information of each ellipse in each concentric ellipse group; and an initial value determination step: determining initial values of an intrinsic parameter and an extrinsic parameter of the camera according to parameter information of the plurality of concentric ellipse groups, wherein the intrinsic parameter of the camera comprises principal point pixel coordinates of the camera and normalized focal lengths of the camera on abscissa and ordinate axes in a pixel coordinate system respectively.

In a camera calibration method according to some embodiments of the present disclosure, the parameter information of the plurality of ellipses comprises a rotation angle and a center point pixel coordinate of each of the plurality of ellipses.

In a camera calibration method according to some embodiments of the present disclosure, the ellipse grouping step comprises: a), acquiring a number M of groups of the plurality of groups of concentric circles in the camera calibration plate and a number N of concentric circles in each group of concentric circles, equating a current number k of groups of the plurality of ellipses to zero, and putting the plurality of ellipses into an ungrouped ellipse set; b), randomly selecting one ellipse from the ungrouped ellipse set, and calculating a distance between a center point of the selected ellipse and a center point of each of other ellipses in the ungrouped ellipse set; c), sorting the other ellipses in order from the shortest to the largest distance between the center point of each of other ellipses and the center point of the selected ellipse, dividing the sorted first N−1 ellipses and the selected ellipse into a group, removing them from the ungrouped ellipse set, and equating the current number k of groups to k+1; d), determining whether the current number k of groups is less than M; e), in response to the fact that k is less than M, determining whether the ungrouped ellipse set is empty; if not empty, going to step b, otherwise going to step f; and f), in response to the fact that k is not less than M or the ungrouped ellipse set is empty, ending the ellipse grouping step.

In a camera calibration method according to some embodiments of the present disclosure, the parameter calculation step comprises: calculating the center point pixel coordinate of each concentric ellipse group according to the center point pixel coordinate of each ellipse in each concentric ellipse group; calculating an average rotation angle of each concentric ellipse group according to the rotation angle of each ellipse in each concentric ellipse group; and calculating a short axis equation for each concentric ellipse group according to the average rotation angle of each concentric ellipse group.

In a camera calibration method according to some embodiments of the present disclosure, the initial value determination step comprises: combining the short axis equation of each concentric ellipse group to form a system of equations, finding a approximate solution of the system of equations by the least squares method, and taking the found approximate solution as an initial value of a principal point pixel coordinate of the camera.

In a camera calibration method according to some embodiments of the present disclosure, the initial value determination step further comprises: calculating a homography matrix according to world coordinates of circle centers of a plurality of concentric circle groups in the camera calibration plate and a center point pixel coordinate of the corresponding concentric ellipse group in the calibration image; calculating a intrinsic parameter matrix of the camera according to the homography matrix and the initial value of the principal point pixel coordinate of the camera; and calculating an initial value of the extrinsic parameter of the camera according to the homography matrix and the camera intrinsic parameter matrix.

In a camera calibration method according to some embodiments of the present disclosure, the initial value determination step further comprises: calculating initial values of normalized focal lengths of the camera on the abscissa and ordinate axes in the pixel coordinate system respectively, according to the intrinsic parameter matrix of the camera and the initial value of the extrinsic parameter of the camera.

In a camera calibration method according to some embodiments of the present disclosure, the initialization step further comprises: setting an initial value of distortion parameters of the camera to zero, wherein the distortion parameters comprises a radial distortion parameter and a tangential distortion parameter.

In a camera calibration method according to some embodiments of the present disclosure, the optimization step comprises: a nonlinear optimization step: nonlinearly optimizing, by using an iterative optimization algorithm, an initial value of the camera parameter to obtain a current camera parameter calibration value; a correction step: correcting the calibration image according to the current camera parameter calibration value; a detection step: detecting, in the corrected calibration image, solid circles corresponding to the solid circle center points in the camera calibration plate by using a standard circle detection algorithm to obtain a circle center coordinate of each of the solid circles; a projection step: projecting the solid circles onto the calibration image according to an anti-distortion projection relationship to obtain a plurality of solid ellipses, and calculating center point coordinates of the plurality of solid ellipses according to circle center coordinates of the solid circles; a distance calculation step: calculating a sum of squares of distances between center points of the plurality of solid ellipses and a center point of a corresponding concentric ellipse group in the calibration image; a determination step: determining whether the sum of squares is greater than a first threshold; a loop optimization step: in response to the fact that the sum of squares is greater than the first threshold, setting the current camera parameter calibration value as the initial value of the camera parameter, and going to the nonlinear optimization step; and a calibration completion step: in response to the fact that the sum of squares is not greater than the first threshold, setting the current camera parameter calibration value as a final calibration value of the camera parameter.

In a camera calibration method according to some embodiments of the present disclosure, the optimization step further comprises a further determination step: determining whether a number of times the nonlinear optimization step was performed is less than a second threshold; the loop optimization step comprises: in response to the fact that the sum of squares is greater than the first threshold and the number of times is less than the second threshold, setting the current camera parameter calibration value as the initial value of the camera parameter, and going to the nonlinear optimization step; and the calibration completion step comprises: in response to the fact that the sum of squares is not greater than the first threshold and the number of times is not less than the second threshold, setting the current camera parameter calibration value as the final calibration value of the camera parameter.

In a camera calibration method according to some embodiments of the present disclosure, the iterative optimization algorithm comprises: a nonlinear least squares algorithm, a neural network algorithm, and a genetic algorithm.

In a camera calibration method according to some embodiments of the present disclosure, the nonlinear least squares algorithm comprises a Levinberg-Marquardt algorithm, a steepest descent algorithm, and a Gauss-Newton algorithm.

According to still another aspect of the present disclosure, there is provided a camera calibration device comprising: an initialization processor configured to determine an initial value of a camera parameter using the camera calibration plate of some embodiments of the present disclosure; and an optimization processor configured to optimize the initial value of the camera parameter in an iterative manner.

According to still another aspect of the present disclosure, an image acquisition system is provided, comprising the camera calibration device according to some embodiments of the present disclosure.

According to still another aspect of the present disclosure, a computer readable storage medium having stored thereon computer readable instructions that, when executed, perform the camera calibration method according to some embodiments of the present disclosure.

BRIEF DESCRIPTION OF THE DRAWINGS

The drawings described herein are intended to provide a further understanding of the disclosure, and constitute a part of the present disclosure. The illustrative embodiments of the present disclosure and the description thereof are intended to explain the present disclosure, and do not constitute an undue limitation of the disclosure. In the drawings.

DETAILED DESCRIPTION OF EMBODIMENTS

Figure 1:
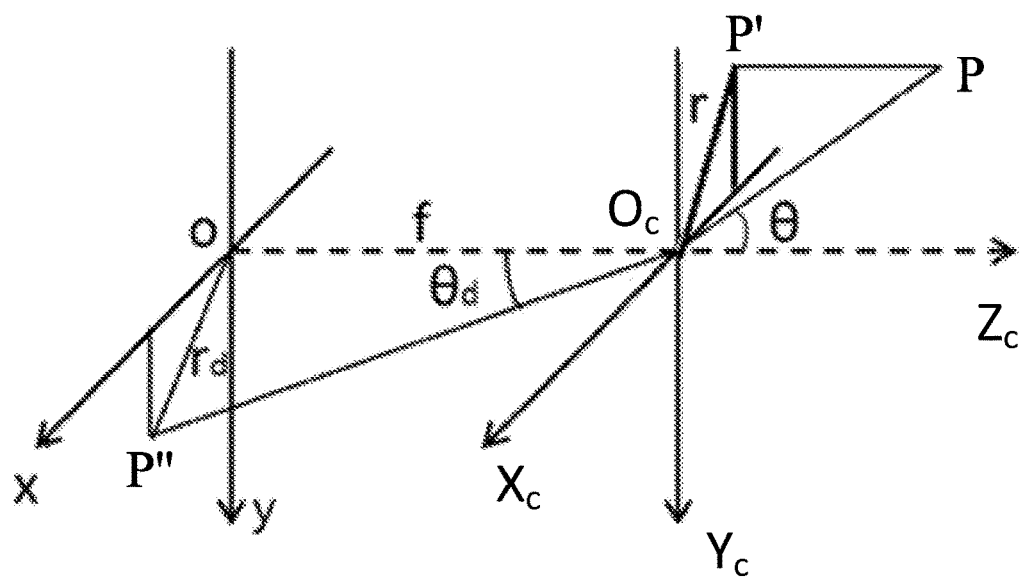
FIG. 1 shows a schematic diagram of a camera imaging geometry model in accordance with some embodiments of the present disclosure.

The technical solutions in the embodiments of the present disclosure will be clearly and completely described below in conjunction with the accompanying drawings. It is apparent that the described embodiments are only a part of the embodiments of the present disclosure, and not all of them. All other embodiments obtained by a person of ordinary skill in the art based on the embodiments of the present disclosure without departing from the inventive scope belong to the scope of the disclosure.

In image measurement processes and machine vision applications, in order to determine the relationship between the three-dimensional geometric position of a point on the surface of a space object and its corresponding point in the image of the camera, a geometric model of the camera imaging must be established. These geometric model parameters are the camera parameters. Under most conditions, these parameters must be obtained through experiments and calculations. This process of solving camera parameters is called camera calibration.

In the related art, the wide-angle camera calibration method is as follows: randomly giving an initial value of a camera parameter, optimizing the initial value of the camera parameter, and then completing the camera parameter calibration. However, the initial value of the camera parameter is randomly set, so that the accuracy of the optimized camera parameter is not high, and the distortion of the image taken by the wide-angle camera is relatively large. For example, generally an initial value of a camera parameter is given randomly or an initialization method of the intrinsic parameter and the distortion in OpenCV is used, to obtain an initial coordinate of a camera principal point, the initial coordinate of the camera principal point is set as a image center coordinate, and then the initial value of the camera parameter is utilized to optimize the camera parameter to achieve camera parameter calibration. However, the calibration results of the camera parameter obtained by these methods are relatively inaccurate, resulting in large distortion of the image captured by the camera.

The above OpenCV is a cross-platform computer vision library based on BSD license (open source) distribution that runs on Linux, Windows, Android and Mac OS operating systems. It consists of a series of C functions and a small number of C++ classes, provides interfaces to languages such as Python, Ruby, and MATLAB, and implements many general algorithms for image processing and computer vision.

In addition, during the camera calibration process, the camera is usually used to capture the image of the calibration plate, and the camera parameters are calculated using the known feature points or the three-dimensional world coordinates of the calibration points in the calibration plate and the corresponding image pixel coordinates on the image. In the related art, the calibration plates used for camera calibration are mostly checkerboard shapes, and the feature points or calibration points are the corner points on the checkerboard calibration plate, that is, the vertices of the small squares. However, when the image distortion is too large or there is some defocus blur, the accuracy of the corner point detection will be significantly reduced.

FIG. 1 shows a schematic diagram of a geometric model of camera imaging in accordance with some embodiments of the present disclosure.

In the geometric model of camera imaging, there are usually four different coordinate systems, namely the world coordinate system $O_w$-$X_w Y_w Z_w$, the camera coordinate system $O_c$-$X_c Y_c Z_c$, the image coordinate system xOy, and the pixel coordinate system uOv. For the sake of simplicity, only the camera coordinate system and the image coordinate system are shown in FIG. 1. The world coordinate system is a three-dimensional space rectangular coordinate system, which can be used as a reference to describe the spatial position of the camera and the object to be measured. As shown in FIG. 1, the origin $O_w$ of the world coordinate system and the three coordinate axes Xw, $Y_w$, $Z_w$ can be freely determined according to the actual situation. The camera coordinate system is also a three-dimensional space rectangular coordinate system, and the origin $O_c$ is located at the optical center of the lens. $X_c$ and $Y_c$ axes are respectively parallel to the x-axis and y-axis of the image coordinate system. The $Z_c$-axis is the lens optical axis, which is perpendicular to the image plane. The origin O1 (referred to as the principal point) of the image coordinate system is the point of intersection between the camera optical axis and the image plane, that is, it is the center point of the image. The x-axis and the y-axis are respectively parallel to the u-axis and the v-axis of the pixel coordinate system, wherein the distance between the origin $O_c$ of the camera coordinate system and the origin $O_1$ of the image coordinate system is the focal length f of the camera. The origin $O_2$ of the pixel coordinate system is located in the upper left corner of the image, and the u-axis and the v-axis are respectively parallel to the two sides of the image plane, reflecting the arrangement of pixels in the camera CCD/CMOS chip. Both the image coordinate system and the pixel coordinate system are two-dimensional planar rectangular coordinate systems built in the image plane. It should be noted that the unit of the coordinate axes u, v in the pixel coordinate system is the number of pixels (integer), and the units of other three coordinate systems are usually length units, such as meter (m) or millimeter (mm).

As shown in FIG. 1, P ($X_w$, $Y_w$, $Z_w$) is a point in the world coordinate system, P' is an orthographic projection of point P on the $X_c O_c Y_c$ plane of the camera coordinate system, and point P'' (u, v) is a actual image point of point P through the camera lens on the image plane. In FIG. 1, θ is the angle between the incident light and the camera optical axis during the imaging process of point P through the camera lens, i.e., the incident angle; $θ_d$ is the refraction angle during the imaging process of point P through the camera lens; r represents the distance from P' to the origin $O_c$ of the camera coordinate system; $r_d$ represents the distance between P'' and the origin O of the image coordinate system. According to the geometric properties of the model shown in FIG. 1, the mathematical expressions of the geometric model of the camera (especially the wide-angle camera) imaging can be obtained as follows:

$$z_c \begin{bmatrix} u \\ v \\ 1 \end{bmatrix} = \begin{bmatrix} \frac{f_x \theta_d}{r} & 0 & c_x & 0 \\ 0 & \frac{f_y \theta_d}{r} & c_y & 0 \\ 0 & 0 & 1 & 0 \end{bmatrix} \begin{bmatrix} R & t \\ 0^T & 1 \end{bmatrix} \begin{bmatrix} x_w \\ y_w \\ z_w \\ 1 \end{bmatrix}, \quad (1)$$

where $f_x$ and $f_y$ are the normalized focal lengths of the camera on the u-axis and the v-axis in the pixel coordinate system, $$f_x = \frac{f}{dx}, f_y = \frac{f}{dy},$$

f is the focal length of the camera, $d_x$ and $d_y$ are respectively the pixel sizes in the u-axis and v-axis directions in the pixel coordinate system; $c_x$ and $c_y$ are the pixel coordinates of the origin O of the camera coordinate system in the pixel coordinate system, i.e., the principal point coordinates; R and t respectively represent the rotation matrix and the translation vector in the coordinate transformation process from the world coordinate system to the camera coordinate system; and $Z_c$ is the z-axis coordinate of the P point in the camera coordinate system. It should be noted that $f_x$, $f_y$, $c_x$, $c_y$ are referred to as camera intrinsic parameters, because they are only related to the camera's own properties; and R, t are referred to as camera extrinsic parameters. In addition, herein the above matrix $$\begin{bmatrix} \frac{f_x \theta_d}{r} & 0 & c_x & 0 \\ 0 & \frac{f_y \theta_d}{r} & c_y & 0 \\ 0 & 0 & 1 & 0 \end{bmatrix}$$

is called an intrinsic parameter matrix, denoted as A, and the matrix $$\begin{bmatrix} R & t \\ 0^T & 1 \end{bmatrix}$$

is called an extrinsic parameter matrix, denoted as B.

Equation (1) gives the relationship between the world coordinate of an arbitrary spatial point P and the pixel coordinate of the projected point of the point P on the image plane during camera imaging. We can perform camera parameter calibration based on the above imaging model.

In general, the camera parameters may comprise a distortion parameter in addition to the camera intrinsic and extrinsic parameters described above. The lens of a wide-angle camera can cause image generation quickly due to the use of a lens, but at the cost of introducing distortion. The distortion parameter mainly comprises radial distortion parameters k1, k2 and tangential distortion coefficients p1, p2.

Figure 2A:
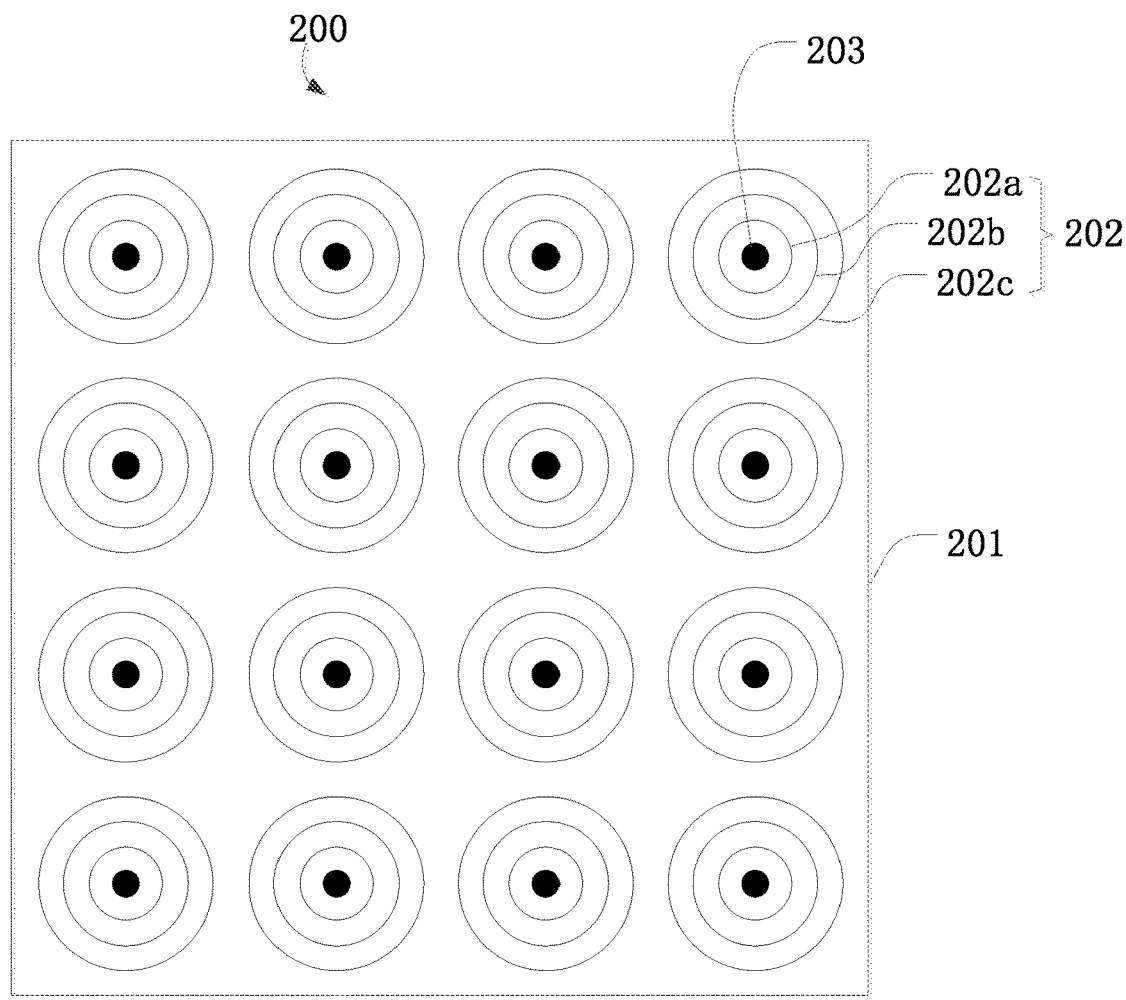
FIG. 2a shows a structure diagram of a camera calibration plate in accordance with some embodiments of the present disclosure.

FIG. 2a illustrates a camera calibration plate in accordance with some embodiments of the present disclosure. As shown in FIG. 2a, the camera calibration plate 200 comprises: a planar plate body 201, a plurality of groups of concentric circles 202 on the planar plate body that are same and solid circle center points 203 of the plurality of groups of concentric circles. Optionally, the plurality of groups of concentric circles 202 are arranged in an array at a fixed circle center distance.

It should be noted that the above "a plurality of groups of concentric circles that are same" means that each group of concentric circles comprises the same number of concentric circles and the radius of the corresponding circle in each group is the same. For example, in case the calibration plate 200 comprises M groups of concentric circles 202 (M is an integer greater than or equal to 2) and each group of concentric circles 202 comprises N circles with different radii (N is an integer greater than or equal to 2), the radius of the circle at the same position in each group of concentric circles is the same, that is, $R_{1i}=R_{2i}=\ldots=R_{Mi}$, where $R_{1i}$ is the radius of the i-th circle contained in the first group of concentric circles, and $R_{2i}$ is the radius of the i-th circle contained in the second group of concentric circles, ..., $R_{Mi}$ is the radius of the i-th circle contained in the M-th group of concentric circles, i is an integer and 1=<i=<N, and wherein the circles comprised in each group of concentric circles are numbered in the same way, i.e., they are numbered in the radial direction from the circle center of the concentric circle to the outermost side of the concentric circle (or from the outermost side of the concentric circle to the circle center of the concentric circle).

As an example, the camera calibration plate 200 schematically illustrated in FIG. 2a comprises 16 groups of concentric circles 202 that are same and solid circle center points 203 of the 16 groups of concentric circles arranged in an array at a fixed distance, each group comprising three concentric circles 202a, 202b, 202c, that is, M=16, N=3. Of course, the number M of groups of concentric circles in the camera calibration plate 200 and the number N of concentric circles in each group are not limited to the number shown in FIG. 2a. Generally, the larger the specific numbers of M and N, the higher the accuracy of the camera calibration will be.

The calibration plate of the circular array pattern can improve the accuracy of the camera calibration as compared to checkerboard calibration plate in the related art. Moreover, with respect to a single circle, the concentric circle structure can detect the images of a plurality of circles with the same circle center, so that the detection of the image of the feature point (i.e., the circle center of the concentric circle) is more accurate, thereby further improving the accuracy of the camera calibration, to reduce the image distortion.

Figure 2B:
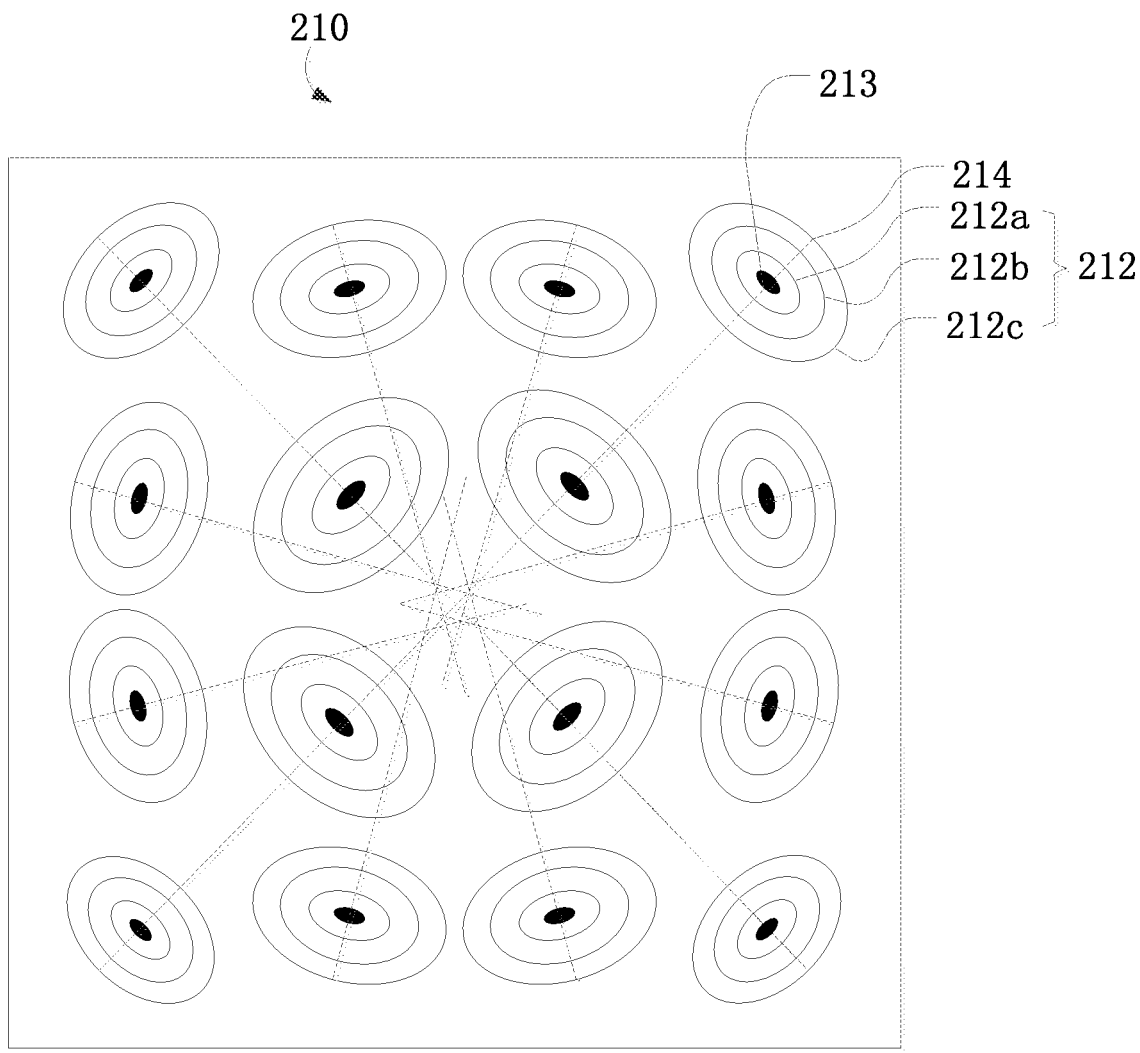
FIG. 2b shows a schematic diagram of a calibration image corresponding to the camera calibration plate shown in FIG. 2a in accordance with some embodiments of the present disclosure.

FIG. 2b shows a schematic diagram of a calibration image corresponding to the calibration plate shown in FIG. 2a, in accordance with some embodiments of the present disclosure.

During the calibration of the camera parameter, the calibration image of the calibration plate is usually taken by the camera to be calibrated, and the camera parameter is calculated by using the three-dimensional world coordinates of the known feature points or the calibration points of the calibration plate and the corresponding pixel coordinates on the corresponding calibration image. When using the camera to capture images of concentric circles, since the lens of a wide-angle camera uses a lens, image generation can be made quickly, but at the expense of introducing distortion. Therefore, the original concentric circle patterns of the calibration plate will be distorted (deformed) during imaging, such that the original concentric circle patterns on the calibration plate are imaged as elliptical patterns in the camera. As shown in FIG. 2b, in the calibration image 210, the plurality of groups of concentric circle patterns 202 in the calibration plate 200 shown in FIG. 2a are projected into a plurality of groups of elliptical patterns 212 in the imaging plane of the camera, and the solid circle center points 203 of the concentric circles are projected as solid center points 213 of the corresponding group of elliptical patterns.

As shown in FIG. 2b, the elliptical patterns have a total of 16 groups, which are in one-to-one correspondence with 16 groups of concentric circles 202 in the calibration plate 200 shown in FIG. 2a. Due to the difference in the degree of distortion caused by the difference in shooting angle and orientation, the various groups of elliptical patterns 212 shown in FIG. 2b are not necessarily strictly elliptical shapes, and the center point coordinates of the respective elliptical patterns in each group are not necessarily identical. For the sake of convenience, an ellipse detection algorithm may be performed on the calibration image 210, to extract strictly elliptical shapes corresponding to the elliptical patterns 212, and to obtain ellipse groups corresponding to the elliptical pattern groups (may be referred to as concentric ellipse groups 212, although the center points thereof are not necessarily identical) shown in FIG. 2b by ellipse grouping. Then, the solid circle center points 203 of the concentric circle groups 202 in the calibration plate 200 and the solid center points 213 of the concentric ellipse groups 212 in the calibration image 210 are feature points to implement parameter calibration. For details, see FIGS. 3-6 and their related descriptions.

In FIG. 2b, dashed lines 214 represent the lines in which the short axes of each concentric ellipse group 212 in the calibration image 210 are, i.e., the short axes 214. Since the plurality of groups of concentric circles 202 which are distributed in an array in the calibration plate 200 are the same size and the same number, under ideal conditions the short axes 214 of the concentric ellipse group 212 formed by the concentric circle group 202 in the corresponding calibration image should intersect at the center point of the image, which is the principal point of the calibration image. However, the short axis 214 of each concentric ellipse group 212 may not be strictly intersected at one point due to factors such as the degree of distortion caused by shooting angle and orientation and the error existing in the ellipse detection extraction process. As shown in FIG. 2b, the short axis 214 of each concentric ellipse group 212 approximates but does not strictly intersect at the center point. As described below, the approximate intersection point of the short axes of the ellipse groups can be obtained as the principal point by the least squares method.

Figure 3:
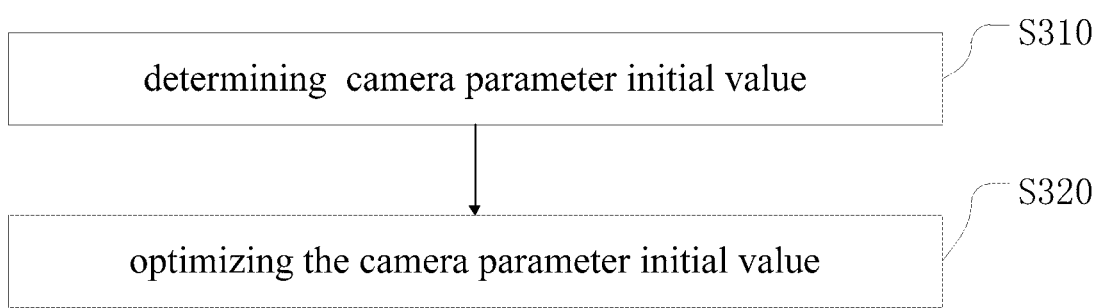
FIG. 3 shows a flow chart of a camera calibration method in accordance with some embodiments of the present disclosure.

FIG. 3 illustrates a flow chart of a camera calibration method in accordance with some embodiments of the present disclosure. A camera calibration method in accordance with some embodiments of the present disclosure may employ the camera calibration plate as shown in FIG. 2a to achieve camera calibration.

As shown in FIG. 3, a camera calibration method according to some embodiments of the present disclosure comprises:

S310, an initialization step: determining an initial value of a camera parameter using the camera calibration plate according to some embodiments of the present disclosure, wherein the camera parameter comprises a camera intrinsic parameter, a camera extrinsic parameter, and a camera distortion parameter.

In some embodiments of the present disclosure, the calibration plate utilized by the camera calibration method is the concentric circle group 202 array structure shown in FIG. 2a, and the initial value of the camera parameter is calibrated by using the camera to capture the calibration image 210 of the calibration plate as shown in FIG. 2b. In the initial value calibration process, methods in the related art, such as Zhang's calibration method, may be adopted, that is, acquire a calibration image of multiple viewing angles, determine feature points or calibration points in the calibration image, and calculate the camera intrinsic parameter, the camera extrinsic parameter, and the camera distortion parameter by using a classic camera imaging model. In addition, the calibration of the camera initialization parameters may be implemented in a manner according to some embodiments of the present disclosure discussed below, that is, only one calibration image may be acquired, and the camera intrinsic parameter and the camera extrinsic parameter are calculated by using the wide-angle camera imaging model shown in formula (1). See FIGS. 4-6.

S320, optimization step: optimizing the initial value of the camera parameter in an iterative manner.

In some embodiments of the present disclosure, the optimization step may be implemented using an algorithm of the related art, such as by minimizing the error between the calculated projection point in the calibration image and the actually positioned projection point of the calibration point in the calibration plate (i.e., projection error). The camera parameters are optimized using the LM algorithm to obtain the final calibration value. In addition, optimization may also be performed using the parameter optimization method according to some embodiments of the present disclosure shown in FIG. 7, as described in detail below with respect to FIG. 7.

In the camera calibration mode of the related art, the initial values of the camera parameters are usually given randomly. For example, the intrinsic parameter and distortion in OpenCV are initialized by using the image center coordinates as the principal point coordinates, and the focal length is initialized to $f_x = f_y = cols/\pi$, where cols is the image pixel width. The present disclosure adopts a calibration plate of concentric circle structure to initialize camera parameters, avoiding optimization algorithm falling into local optimum, making camera parameter calibration more accurate and improving image distortion. In addition, iteratively optimizing the camera intrinsic parameter, extrinsic parameter and distortion parameter can improve the disadvantage that the center point detection is inaccurate due to the excessive distortion of the calibration image.

Figure 4:
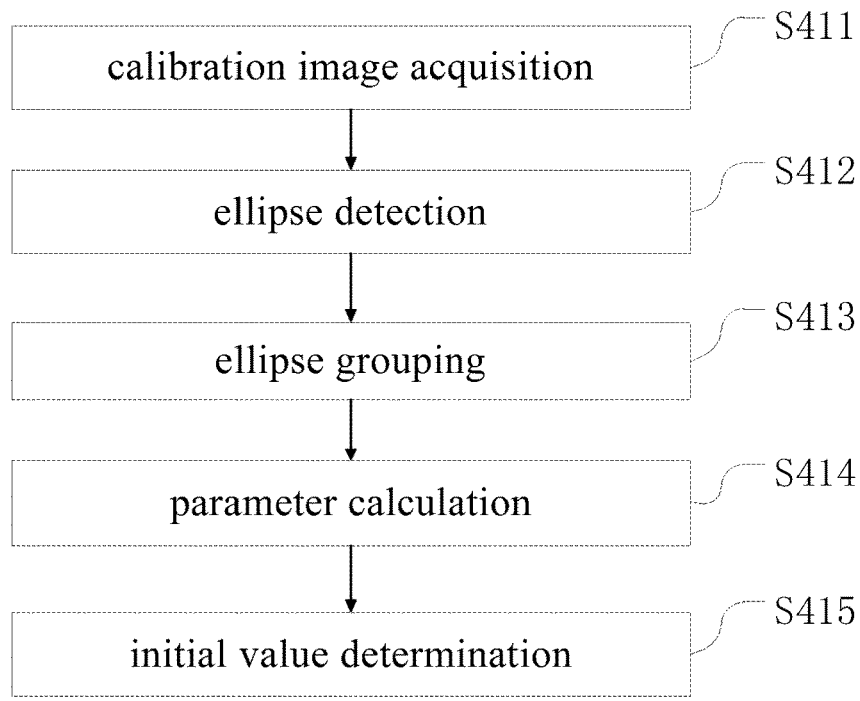
FIG. 4 shows a flow chart of a camera calibration method in accordance with some embodiments of the present disclosure.

FIG. 4 shows a flow chart of a camera calibration method in accordance with some embodiments of the present disclosure. As shown in FIG. 4, the initialization step S310 in FIG. 3 may comprise the following steps S411-S414.

S411, a calibration image acquisition step: acquiring a calibration image of the camera calibration plate captured by the camera, the calibration image comprising a plurality of groups of elliptical patterns and solid center points of the plurality of groups of elliptical patterns formed by the plurality of groups of concentric circles in the camera calibration plate and solid circle center points of the plurality of groups of concentric circles.

The acquisition of the calibration image is performed by the camera to be calibrated, and specifically can be performed by placing the camera calibration plate into the camera field of view and photographing the camera calibration plate to obtain a calibration image. The calibration image should contain images of each group of concentric circles and their circle center points in the calibration plate.

When an image of a concentric circle is captured by a camera, the concentric circle pattern may be distorted (deformed) due to the characteristics of the wide-angle camera, so that the original concentric circle pattern on the calibration plate is imaged as an ellipse in the camera. As shown in FIGS. 2a and 2b, the plurality of groups of concentric circle patterns 202 in the calibration plate 200 shown in FIG. 2a are projected into a plurality of groups of elliptical patterns 212 in the imaging plane of the camera, while the solid circle center points 203 of the concentric circles 202 are projected as solid center points 213 of the plurality of groups of elliptical patterns. Different from the related art, regarding the number of calibration images, in the embodiment of the camera calibration method of the present disclosure, it is not necessary to capture multiple images of the calibration plate from different viewing angles (for example, the Zhang's calibration method needs no less than 3 calibration images) and the camera calibration process can be achieved by simply capturing one calibration image of the calibration plate. Of course, in the present disclosure, the number of calibration images is not limited to one, and multiple calibration images may be obtained by multiple shootings of multiple viewing angles. In this way, the camera parameters can be calculated according to each image separately, and finally the multiple results are averaged to reduce the initial calibration error of the camera parameter, and to provide calculation accuracy.

S412, an ellipse detection step: extracting in the calibration image, by using an ellipse detection algorithm, a plurality of ellipses respectively corresponding to concentric circles in the plurality of groups of concentric circles in the camera calibration plate, and acquiring parameter information of the plurality of ellipses.

In order to obtain the parameter information of the elliptical image in the calibration image corresponding to the concentric circle in the calibration plate, the ellipse detection algorithm may be used to perform ellipse detection on the calibration image, thereby extracting all the ellipses in the calibration image, to obtain elliptic equations thereof. Then, according to each elliptic equation, its parameter information can be calculated, such as the rotation angle, the coordinates of the center point, the long axis length, the short axis length, the long axis equation, the short axis equation of the ellipse, and the like. The above ellipse detection (or fitting) algorithm may employ, for example, a random Hough transform ellipse detection algorithm, a boundary cluster ellipse detection algorithm, or the like in the related art. As shown in FIG. 2b, the ellipse extraction can be implemented by using the ellipse detection algorithm of the related art at the position where the elliptical pattern group 212 is located in the calibration image 210, thereby acquiring multiple ellipses 212 in one-to-one correspondence with each ellipse in the concentric circle group 202 in the calibration plate 200.

S413, an ellipse grouping step: dividing the plurality of ellipses into a plurality of concentric ellipse groups respectively corresponding to the plurality of groups of concentric circles in the camera calibration plate according to parameter information of the plurality of ellipses.

After extracting all the ellipses in the calibration image by the ellipse detection algorithm, these ellipses need to be grouped to obtain parameter information of the concentric ellipse group corresponding to the concentric circle group in the calibration plate, and then the camera parameter is determined according to the parameter information of each concentric ellipse group. Such grouping is actually to group the ellipses with the same or similar center points into the same group, called the concentric ellipse group (in fact, the center point of the individual ellipse in the group may not be exactly the same due to different degrees of distortion). As shown in FIGS. 2a and 2b, in the calibration image 210, three concentric ellipses 212a, 212b, 212c corresponding to the positions of the three circles 202a, 202b, 202c in the same concentric circle group 202 in the upper right corner of the calibration plate 200 can be classified as a concentric ellipse group 212.

The specific manner of ellipse grouping can be performed according to the degree of proximity of the center point of each ellipse. For example, in the case of knowing the number N of each group of concentric circles in the calibration plate, an ellipse is randomly selected throughout all the ellipses, and the distances between the center points of the other ellipses and the center point of the selected ellipse are calculated. The first N−1 ellipses with shortest distances from the center point of the selected ellipse and the selected ellipse are classified into a concentric ellipse group. The rest can be done in the same manner, until all the ellipses are grouped. For detailed grouping, please refer to the detailed description about FIG. 5.

In addition, grouping may be performed in other ways, as long as the ellipses having the same or close center points are grouped into the same group. For example, an ellipse may be randomly selected, the coordinate of the center point thereof is obtained, which is marked as the first center point coordinate. Then, the distances between the center points of the other ellipses and the first center point are calculated, and those ellipses whose distances are less than a preset distance threshold and the ellipse comprising the first center point are classified into the first group. The above steps are repeated to obtain the second group. The rest can be done in the same manner, until all the ellipses are grouped.

S414, a parameter calculation step: calculating parameter information of the plurality of concentric ellipse groups according to parameter information of each ellipse in each concentric ellipse group.

Similar to the parameters of the ellipse, the parameters of the concentric ellipse group may comprise, for example, the center point coordinates, the short axis equation, the average rotation angle of the ellipse group, and the like. The parameters of the concentric ellipse group can be determined by a fitting method. For example, as shown in FIG. 2b, the center point coordinate of the concentric ellipse group 212 can be calculated by calculating the mean value of the center point coordinates of the respective ellipses 212a, 212b, 212c in the group; the average rotation angle of the concentric ellipse group 212 can be calculated by calculating the mean value of the rotation angles of the respective ellipses 212a, 212b, and 212c in the group; and the short-axis equation of the concentric ellipse group 212 may be calculated according to the average rotation angle of the concentric ellipse group, or can also be obtained by fitting the short-axis equation of each ellipse 212a, 212b, 212c in the group. In addition to this, the parameters of the ellipse group 212 can also be calculated by the parameters of the respective ellipses 212a, 212b, 212c in the concentric ellipse group 212 by other means.

For example, in some embodiments, the parameter calculation step S414 may comprise: calculating the center point pixel coordinate of each concentric ellipse group according to the center point pixel coordinate of each ellipse in each concentric ellipse group; calculating an average rotation angle of each concentric ellipse group according to the rotation angle of each ellipse in each concentric ellipse group; and calculating a short axis equation for each concentric ellipse group according to the average rotation angle of each concentric ellipse group.

S415, an initial value determination step: determining initial values of an intrinsic parameter and an extrinsic parameter of the camera according to parameter information of the plurality of concentric ellipse groups, wherein the intrinsic parameter of the camera comprises principal point pixel coordinates and normalized focal lengths of the camera on the abscissa and ordinate axes in a pixel coordinate system respectively.

Figure 6:
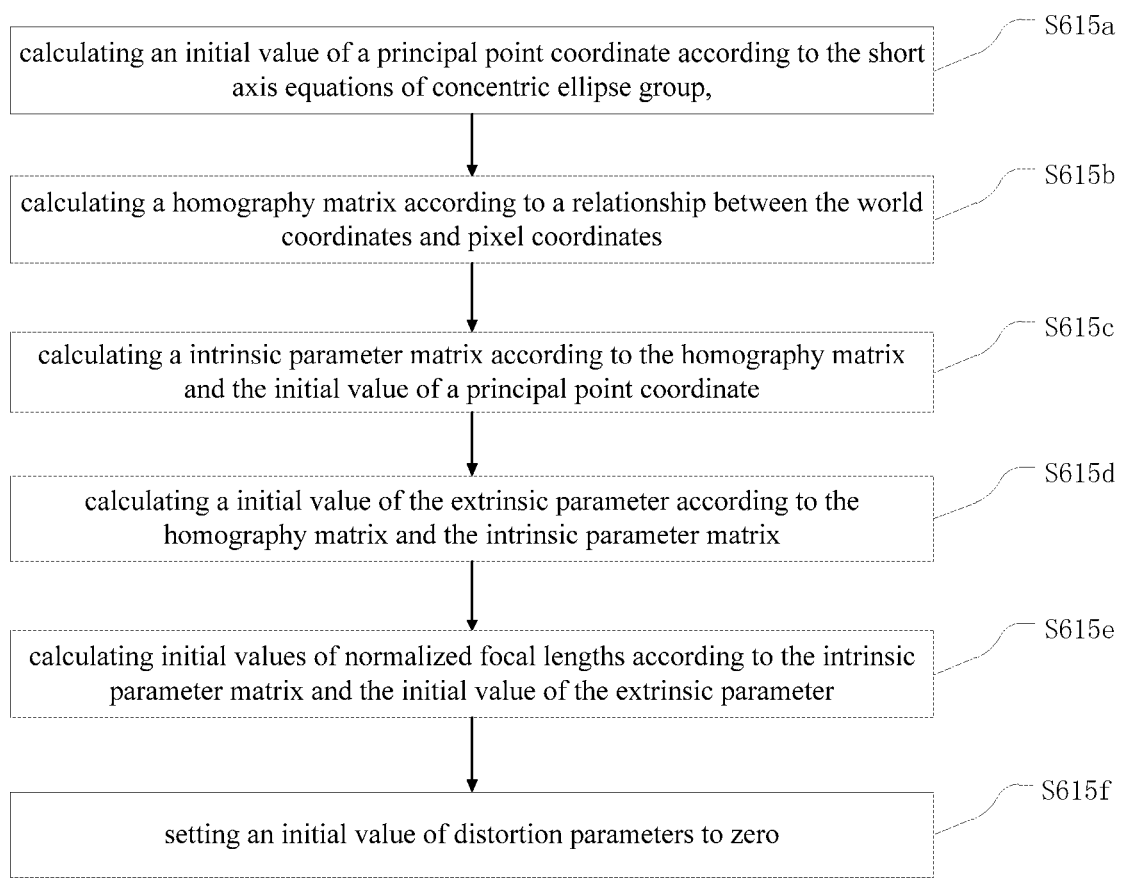
FIG. 6 shows a flow chart of a camera calibration method in accordance with some embodiments of the present disclosure.

In some embodiments of the present disclosure, the intrinsic and extrinsic parameters of the camera may be determined according to the parameter information of the concentric ellipse group and the correspondence relationship of the parameter information of the original concentric circle group. For example, the initial values of the intrinsic and extrinsic parameters may be determined by the method according to some embodiments of the present disclosure as shown in FIG. 6. For example, the principal point pixel coordinate of the camera to be calibrated may be determined according to the intersection of the short axes of each concentric ellipse group. Then the homography matrix between the original pattern of the calibration plate and the calibration image are calculated according to the world coordinate of the circle center of the concentric circle group and the center point pixel coordinate of the corresponding concentric ellipse group. Finally, according to the above conditions, the extrinsic parameters and other intrinsic parameters of the camera may be determined. For the specific calculation of initial values of camera parameters, please refer to FIG. 6.

Figure 5:
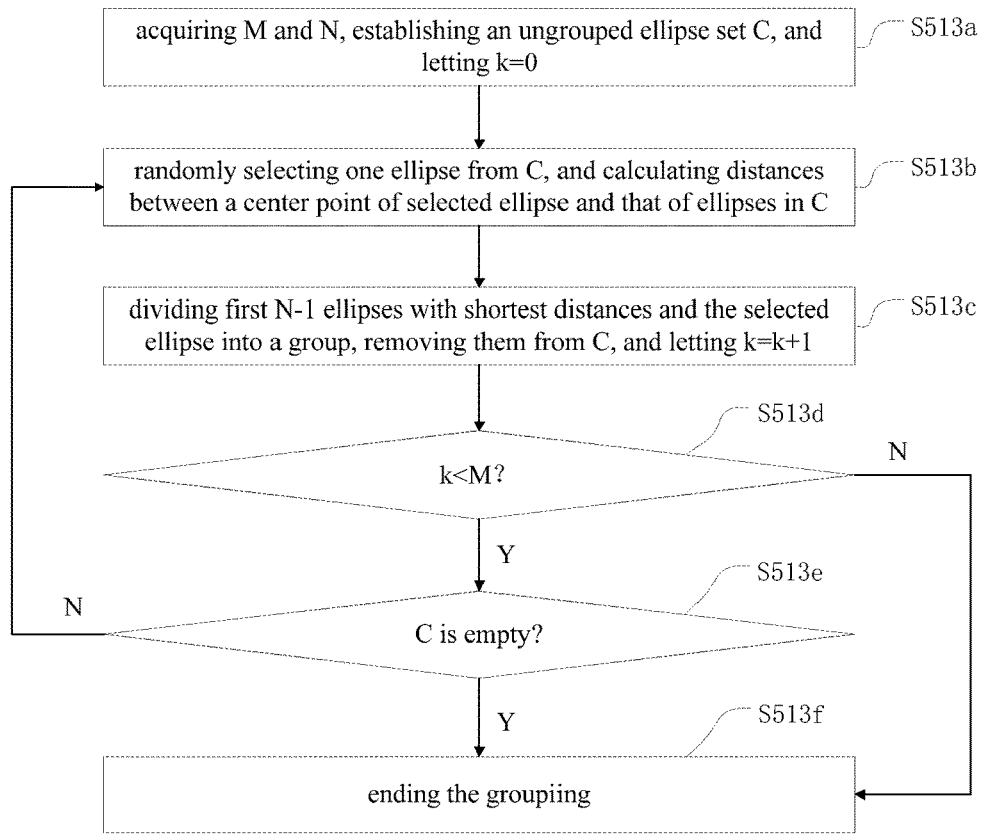
FIG. 5 illustrates a flow chart of a camera calibration method in accordance with some embodiments of the present disclosure.

FIG. 5 illustrates a flow chart of a camera calibration method in accordance with some embodiments of the present disclosure.

As described above, the concentric ellipse groups can be divided according to the degree of proximity of the center point of each ellipse. As shown in FIG. 5, the ellipse grouping step S413 in FIG. 4 may comprise the following steps S513a-S513e.

S513a, acquire a number M of groups of the plurality of groups of concentric circles in the camera calibration plate and a number N of concentric circles in each group of concentric circles, equate the current number k of groups of the plurality of ellipses to zero, and put the plurality of ellipses into an ungrouped ellipse set C.

When dividing a concentric ellipse group according to the degree of proximity of the center point in the calibration image, it is first necessary to know the number of groups of corresponding concentric circles in the calibration plate and the number of concentric circles in each group. Since the camera calibration plate is given before the camera calibration process, the number M of groups of concentric circles and the number N of concentric circles in each group are also determined. For example, as shown in FIGS. 2a and 2b, the number M of groups of concentric circles in the calibration plate 200 is equal to 16 and the number N of concentric circles in each group is equal to 3.

Since the purpose of the ellipse grouping in the calibration image is to determine the concentric ellipse group corresponding to the concentric circle group in the calibration plate, thereby facilitating the use of the camera imaging model to calibrate the camera parameter in advance, the number of groups of the ellipses should be consistent with the number of groups of concentric circles. However, due to the difference in shooting angle and position, the camera may not completely cover all groups of the concentric circles in the calibration plate when shooting. Generally, if the field of view of the camera completely covers the plane of the calibration plate when the camera is shooting, the calibration image contains images of all concentric circles in the calibration plate, so the number of concentric ellipse groups in the calibration image should be equal to the number M of concentric circle groups in the calibration plate, and the number of concentric ellipses in each ellipse group is equal to the number N of concentric circles in each circle group. In addition, if the field of view of the camera may not completely cover the plane of the calibration plate when the camera is shooting due to the problem of the angle of view, the number of concentric ellipse groups may be smaller than the number M of concentric circle groups.

Before the specific grouping, two dynamic variables need to be established: the ungrouped ellipse set C and the dynamic variable k of the current group number, wherein the initial values of the ungrouped ellipse set C are all the ellipses detected in the calibration image, and the initial value of k is 0, because all the ellipses are not grouped before starting the grouping. The changes in k and C can then be used to determine if the grouping is completed.

S513b, randomly select one ellipse from the ungrouped ellipse set C, and calculate a distance between a center point of the selected ellipse and a center point of each of other ellipses in the ungrouped ellipse set C.

The degree of proximity of the center point between the ellipses can be characterized by the distance between the two, so by calculating the distance between the center points, the degrees of proximity of all other ellipses to the selected ellipse can be known, and then the nearest N−1 (N is the number of concentric circles contained in the corresponding concentric circle group) ellipses (or several ellipses with distances close to zero) are selected to form a group with the selected ellipse.

S513c, sort the other ellipses in order from the shortest to the largest distance between the center point of each of other ellipses and the center point of the selected ellipse, divide the sorted first N−1 ellipses and the selected ellipse into a group, remove them from the ungrouped ellipse set C, and equate the current number k of groups to k+1;

As described above, the N−1 ellipses whose center points are closest to the center point of the selected ellipse and the selected ellipse are divided into a group, which can be considered as a concentric ellipse group corresponding to a group of concentric circles in the calibration plate. As shown in FIGS. 2a and 2b, the number N of concentric circles in each concentric circle group 202 in the calibration plate 200 is equal to 3, so the number of ellipses in the corresponding concentric ellipse group 212 in the calibration image 210 formed by the calibration plate 200 should also be set to 3. Thus, the two ellipses whose center points are closest to the center point of the selected ellipse can be grouped together with the selected ellipse. For example, if the ellipse 212a is randomly selected, the two ellipses closest to its center point are apparently 212b and 212c. Then the three ellipses 212a, 212b, 212c can be grouped into a concentric ellipse group 212.

After this grouping, the ungrouped ellipse set C and the current number k of groups need to be updated to conform to the current grouping process, where N ellipses of the current grouping need to be removed from the ungrouped ellipse set C, and the number k of groups should be increased by one.

S513d, determine whether the current number k of groups is less than M, and if k<M, then go to step S513e, otherwise go to step 513f, and end the grouping.

After end of each grouping, it is necessary to determine whether the grouping needs to be continued, that is, whether the number k of groups has reached the critical value M or whether the ungrouped ellipse set C is empty, and the grouping can be ended as long as one of the two conditions is satisfied. The two ending conditions are established because the original calibration plate pattern in the calibration plate may not be completely covered in the calibration image as mentioned above, that is, the number of concentric ellipse groups in the calibration image is smaller than the number M of concentric circle groups. Therefore, it is necessary to add a step of determining whether the ungrouped ellipse set C is empty, to meet different actual situations. Of course, step S513d may also be omitted to directly determine whether the ungrouped ellipse set C is empty to determine whether to continue the grouping loop. The purpose of adding the step S513d is that, in general, the field of view captured by the camera should comprise the entire plane of the calibration plate, that is, the number of concentric ellipse groups comprised in the calibration image is equal to the number N of concentric circle groups of the calibration plate. In this way, it is practically unnecessary to determine the ungrouped ellipse set C, instead it is only necessary to determine whether the number k of the groups reaches M, thereby improving efficiency.

S513e: determine whether the ungrouped ellipse set C is empty. If not, go to step S513b; otherwise go to step S513f, and end the grouping.

When it is determined that k does not reach the critical value M and C is not empty, it is indicated that the grouping is not ended, it is necessary to continue to return to step S513b, and the grouping process is started again, that is, an ellipse is randomly selected again in the remaining ungrouped ellipse set C, and the above steps of S513-S513e are repeated until all ellipses are grouped. In this way, concentric ellipse groups in one-to-one correspondence with the concentric circle groups in the original image of the calibration plate can be obtained, thereby facilitating the subsequent determination of the parameter information of the ellipse groups.

S513f, in response to the fact that k>=M or the ungrouped ellipse set is empty, end the grouping.

FIG. 6 illustrates a flow chart of a camera calibration method in accordance with some embodiments of the present disclosure.

In the initialization process of the camera calibration, the initial values of the camera parameter are calculated by mainly using the relationship between the world coordinates of the feature points (i.e., the circle center points of the concentric circles) in the calibration plate pattern in the camera geometric model and the pixel coordinates of their corresponding points in the calibration image formed in the camera. As described above, the camera parameters generally comprise intrinsic parameters, extrinsic parameters, and distortion parameters, wherein the intrinsic parameters comprise the coordinate ($c_x$, $c_y$) of the principal point (the intersection of the camera optical axis and the calibration image (image plane)), and the normalized focal lengths $f_x$ and $f_y$ of the camera on the coordinate axes (i.e., the u-axis and the v-axis) in the pixel coordinate system. The embodiment shown in FIG. 6 primarily discusses the calculation of the initial values of the intrinsic and extrinsic parameters. Specifically, as shown in FIG. 6, the initial value determination step S415 in FIG. 4 may specifically comprise steps S615a-S615e, which may be further divided into three parts: a principal point initial value determination step S615a in the intrinsic parameter; an extrinsic parameter initial value determination steps S615b-S615d; and the normalized focal length determination step S615e in the intrinsic parameter. Further, S415 may further comprise a distortion parameter initial value determination step S615f.

Firstly, the determination of the initial value of the principal point is introduced. As described above, since the plurality of groups of concentric circles which are distributed in an array in the calibration plate are the same size and the same number, under ideal conditions the short axes of the concentric ellipse group formed by the concentric circle group in the corresponding calibration image should intersect at the center point of the image, which is the principal point of the calibration image. However, as shown in FIG. 2b, the short axis 214 of each concentric ellipse group 212 approximates but does not strictly intersect at the center point due to factors such as the degree of distortion caused by shooting angle and the error existing in the ellipse extraction process. At this time, the approximate intersection point of the short axes of the ellipse groups can be obtained as the principal point by the least squares method.

As shown in FIG. 6, the initial value determination step S415 shown in FIG. 4 may comprise a principal point initial value determination step:

S615a, combining the short axis equation of each concentric ellipse group to form a system of equations, finding a approximate solution of the system of equations by the least squares method, and taking the found approximate solution as an initial value of a coordinate of a camera principal point.

In the process of determining the initial value of the principal point coordinates shown in FIG. 6, in order to calculate the approximate intersection coordinate of the short axis of each concentric ellipse group, the plane analytic geometry method is mainly used: firstly, as described above, in parameter calculation step S414 of the concentric ellipse group, the short axis equation of each concentric ellipse group can be calculated according to the average rotation angle of all the ellipses in the concentric ellipse group; then, a system of the linear equations are formed by combining a plurality of short axis equations, and finally a solution of the system of equations is solved. Since the number of equations in a system of equations is generally greater than the number of unknowns (the number of short-axis equations of a concentric ellipse group may be the same or less than the number of concentric circle groups; as shown in FIGS. 2a and 2b, due to the short axes 214 coincides, the number of short axis equations is 12, and the unknowns are the plane pixel coordinates, i.e., 2 unknowns), the approximate solution can be obtained by the least squares method, and the approximate solution can be set as the initial value of the coordinate of the principal point. It should be noted that during the calculation of the short axis equation of the ellipse group, although the present embodiment uses the average rotation angle for calculation, other methods may be used for determination. For example, the short axis equation of the concentric ellipse group can be obtained based on the short axis equation of each ellipse in each group of concentric ellipses by linear fitting.

Secondly, after the initial value of the principal point coordinate is determined, the initial value of the camera extrinsic parameter can be determined according to the homography relationship between the original pattern of the calibration plate and the calibration image and the initial value of the principal point coordinate. More specifically, as shown in FIG. 6, the parameter initial value determination step S415 shown in FIG. 4 may further comprise extrinsic parameter determination steps S615b-S615d.

S615b, determine a homography matrix according to world coordinates of circle centers of a plurality of concentric circle groups and center point pixel coordinates of the corresponding plurality of concentric ellipse groups.

As described above, the circle center of the concentric circle of the calibration plate can be used as a feature point or calibration point, and then the homography relationship between the original pattern of the calibration plate and the calibration image can be determined according to the relationship between the original world coordinates of the feature point in the calibration plate and the pixel coordinates of the center point of the formed concentric ellipse group of the feature point in the image plane. In computer vision, the homography of a plane can be defined as a projection mapping from one plane to another, which can be represented by a so-called homography matrix. Specifically, in the case of knowing the world coordinate of the feature point (i.e., the circle center of the concentric circle group) and the pixel coordinate of the corresponding projection point (the center point of the concentric ellipse group), the projection mapping relationship between the two can be calculated, which is the homography matrix H between the calibration plate plane and the calibration image plane, where H is a 3×3 matrix and may be expressed as follows: H=[$h_1$ $h_2$ $h_3$], wherein $h_i$ (i=1, 2, 3) is a column vector of the matrix H.

S615c, calculate a camera intrinsic parameter matrix according to the homography matrix and the initial value of the coordinate of the principal point.

In general, according to the camera imaging model and the formula (1) in this description, the following formula can be derived:

$$H=[h_1 h_2 h_3]=\lambda A[r_1 r_2 t] \quad (4)$$

Where A is the intrinsic parameter matrix, $\lambda$ is the scaling factor, t is the translation vector, $r_1$ and $r_2$ are the first two column vectors in the rotation matrix R=[$r_1$ $r_2$ $r_3$], and R and t are the extrinsic parameters of the camera.

The above formula (4) gives the relationship between the homography matrix and the intrinsic and extrinsic parameters. Since $r_1$ and $r_2$ are the column vectors of the rotation matrix, the following two constraints can be derived:

$$h_1^T A^{-T} A^{-1} h_2 = 0 \quad (5)$$

$$h_1^T A^{-T} A^{-1} h_1 = h_2^T A^{-T} A^{-1} h_2 \quad (6)$$

On the other hand, as described above, the intrinsic parameter matrix $$A = \begin{bmatrix} \frac{f_x \theta_d}{r} & 0 & c_x & 0 \\ 0 & \frac{f_y \theta_d}{r} & c_y & 0 \\ 0 & 0 & 1 & 0 \end{bmatrix}.$$

When $$\frac{f_x \theta_d}{r} = Q_1 \text{ and } \frac{f_y \theta_d}{r} = Q_2,$$

the values of $Q_1$ and $Q_2$ can be calculated according to the formulas (5), (6) and the principal point coordinates $c_x$ and $c_y$ which have been found. Thus, the intrinsic parameter matrix A can be obtained.

S615d, calculate the initial value of the camera extrinsic parameter according to the homography matrix and the intrinsic parameter matrix.

Referring to the Zhang's calibration method, after acquiring the intrinsic parameter matrix A, the initial values of the column vectors $r_1$, $r_2$ and $r_3$ and the translation vector t of the rotation matrix R=[$r_1$ $r_2$ $r_3$] in the camera extrinsic parameter matrix $$B = \begin{bmatrix} R & t \\ 0^T & 1 \end{bmatrix}$$

can be easily obtained by using the above formulas (4)-(6) as follows:

$$r_1=\lambda A^{-1}h_1, r_2=\lambda A^{-1}h_2, r_3=r_1 \times r_2, t=\lambda A^{-1}h_3,$$

Where $\lambda=1/\|A^{-1} h_1\|=1/\|A^{-1} h_2\|$.

As shown in FIG. 6, the parameter initial value determination step S415 shown in FIG. 4 may further comprise the following steps:

S615e, calculate initial values of normalized focal lengths of the camera on the two axes in the pixel coordinate system, according to the intrinsic parameter matrix and the initial value of the camera extrinsic parameter.

After acquiring the intrinsic parameter matrix, the extrinsic parameter matrix or the initial value of the extrinsic parameter, the camera geometric model can be combined to calculate the normalized focal lengths $f_x$ and $f_y$ of the camera. The specific calculation process is as follows.

Firstly, the values of the parameters $Q_1$ and $Q_2$ in the intrinsic parameter matrix A are obtained according to step S615f. As described in the step S615f:

$$Q_1 = \frac{f_x \theta_d}{r}, \quad (7)$$

$$Q_2 = \frac{f_y \theta_d}{r}, \quad (8)$$

where $\theta_d$ is the refraction angle of the lens, r is the distance between the orthographic projection point of the circle center of the concentric circle group at the xOy coordinate plane of the camera coordinate system and the lens optical center (i.e., the origin of the camera coordinate system), and where r can be calculated from the initial value of the camera extrinsic parameter and the world coordinate of the circle center of each concentric circle group of the calibration plate. See below.

Secondly, according to the camera imaging geometric model shown in FIG. 1, it can be obtained that:

$$\tan\theta_d = \frac{r_d}{f} = \frac{r_d}{f_x dx} = \frac{r_d}{f_y dy}, \quad (9)$$

where $r_d$ is the distance between the center point of the concentric ellipse group in the calibration image and the origin of the image coordinate system, f is the focal length of the camera, and $d_x$ and $d_y$ are respectively the picture element sizes of the horizontal and vertical axes in the pixel coordinate system (which are already known), and where $r_d$ can be obtained simply by the distance formula of the plane geometry (where the center point coordinate of the concentric ellipse group can be obtained according to the parameter determination step S414 shown in FIG. 4).

Again, the equations (7)-(9) are combined to form a system of equations. For the center point of each concentric ellipse group and the circle center of the corresponding concentric circle group, $f_x$ and $f_y$ are solved to obtain multiple groups of solutions of $f_x$ and $f_y$. The $f_x$ and $f_y$ of the plurality of groups of solutions are averaged respectively, to obtain initial values of a normalized focal lengths of the camera on the u-axis and the v-axis in the pixel coordinate system. According to the above, since $d_x$ and $d_y$ are known to be fixed, and r and $r_d$ can be calculated from the coordinates of the corresponding circle center point and the center of the circle, the above system of equations contains three unknowns, namely $f_x$, $f_y$ and $\theta_d$. Thus, for the center point of each concentric ellipse group and the circle center of the corresponding concentric circle group, the solutions of $f_x$ and $f_y$ in the system of equations can be obtained by substituting the obtained parameters r and $r_d$ and the fixed parameters $d_x$ and $d_y$.

During the calculation process, for the M circle centers of all M (for example, M=12 in FIG. 2) concentric circle groups in the calibration plate and the M center points of the M concentric ellipse groups in the corresponding calibration image, the above parameters r and $r_d$ can be calculated respectively by using the extrinsic parameter matrix, to obtain M groups of values of r and $r_d$. Then the M groups of the results are substituted into the system of equations formed by the above formulas (7)-(9) respectively, to calculate the M groups of solutions of the system of equations. Finally, the M groups of solutions are averaged to obtain the initial values of $f_x$ and $f_y$. Compared with a single feature point, solving a system of equations for multiple feature points or calibration points to obtain multiple groups of solutions and averaging them can reduce the calculation error and improve the calculation accuracy.

In some embodiments, the specific calculation steps for the circle center P, r for each group of concentric circles are as follows.

(i) based on the initial value of the extrinsic parameter of the camera and the world coordinates $(X_w, Y_w, Z_w)$ of the circle center P, the coordinates $(X_c, Y_c, Z_c)$ of the circle center P in the camera coordinate system are obtained according to the following formula (10):

$$\begin{bmatrix} X_c \\ Y_c \\ Z_c \\ 1 \end{bmatrix} = \begin{bmatrix} R & t \\ 0^T & 1 \end{bmatrix} \begin{bmatrix} X_w \\ Y_w \\ Z_w \\ 1 \end{bmatrix}; \quad (10)$$

(ii) the coordinates in the camera coordinate system are normalized as follows:

$$x = \frac{X_c}{Z_c}, \quad y = \frac{Y_c}{Z_c};$$

(iii) According to the plane geometric distance formula, the distance r from the projection point of the circle center P on the xOy coordinate plane of the camera coordinate system to the origin is obtained as follows: $r=(x^2+y^2)^{1/2}$.

It can be seen from the above that, the homography matrix is used as the model, and the homography matrix and the homography relationship characterizing between the center point of the concentric ellipse and the center point of the concentric circle are used to calculate the initial value of the camera extrinsic parameter. In this way, the initial value of the set camera extrinsic parameter is relatively accurate. The initial value of the camera focal length is obtained by using the initial value of the camera extrinsic parameter and the camera imaging model, so that the obtained initial value of the camera focal length is close to the theoretical value, avoiding local optimal problems that occur during subsequent camera parameter optimization.

In some embodiments, as shown in FIG. 6, the parameter initial value determination step S415 shown in FIG. 4 may further comprise: S615f, setting an initial value of a camera distortion parameter to zero, wherein the camera distortion parameter comprises a radial distortion parameter and a tangential distortion parameter.

Generally, in the camera calibration process, the calibration of the distortion parameter can be performed by referring to related techniques. For example, the initial values of the radial distortion parameters k1, k2 and the tangential distortion parameters p1, p2 are set to 0, and then are gradually optimized by the iterative algorithm.

Figures 7, 8:
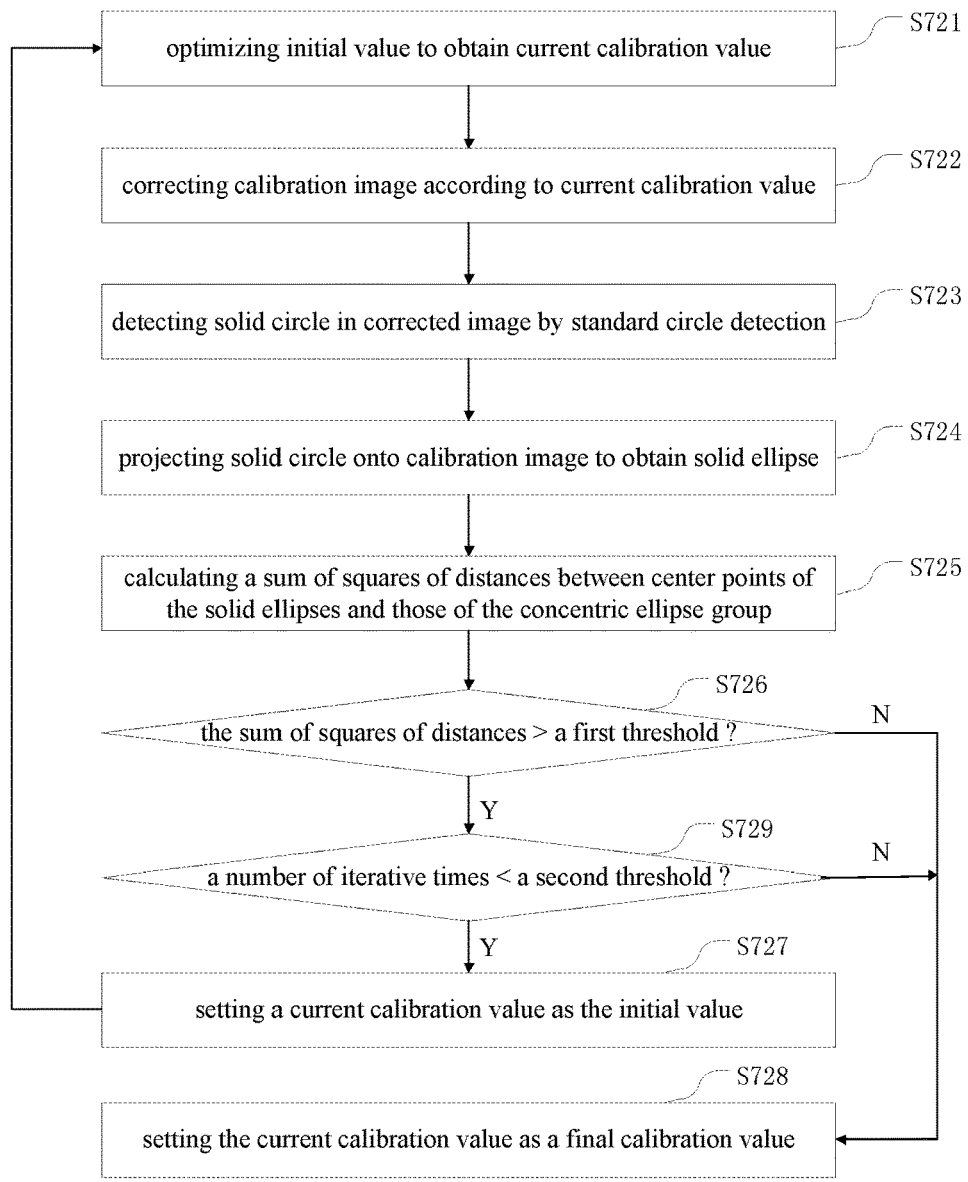
FIG. 7 illustrates a flow chart of a camera calibration method in accordance with some embodiments of the present disclosure.
FIG. 8 shows a block diagram of a structure of a camera calibration device in accordance with some embodiments of the present disclosure.

FIG. 7 shows a flow chart of a camera calibration method in accordance with some embodiments of the present disclosure. In some embodiments of the camera calibration method according to the present disclosure, as shown in FIG. 3, an iterative optimization step S320 may be comprised in addition to the camera parameter initialization step S310 described above.

Specifically, as shown in FIG. 7, the iterative optimization step S320 of FIG. 3 may comprise the following steps S721-S728.

S721, a nonlinear optimization step: by using an iterative optimization algorithm, nonlinearly optimizing an initial value of a camera parameter to obtain a current camera parameter calibration value.

In step S721, the initial values of camera parameters may comprise the results obtained in the initialization process shown in FIGS. 4-6, comprising initial values of camera intrinsic parameters, extrinsic parameters, and distortion parameters.

Specifically, the initial values of camera intrinsic parameters, extrinsic parameters, and distortion parameters may be optimized by using the optimization algorithm, to obtain the current camera parameter calibration values, according to the relationship between the center point pixel coordinate of the plurality of concentric ellipse groups in the calibration image and the world coordinates of the circle center of the corresponding plurality of concentric circles in the calibration plate. In some embodiments according to the present disclosure, the iterative optimization algorithm may comprise a nonlinear least squares method, which may comprise, for example, a Levenberg-Marquardt (LM) algorithm, a steepest descent method, Gauss-Newton method, etc. In addition, the iterative optimization algorithm may also adopt, for example, a neural network algorithm, a genetic algorithm, or the like.

For example, firstly, the objective function is established as follows:

$$\Sigma_{i=1}^{N} \|m_i - \hat{m}(A,B,k_1,k_2,p_1,p_2,M_i)\|^2,$$

where $m_i$ is the center point coordinates of the of concentric ellipse groups in the actually detected calibration image, $\hat{m}$ is the center point coordinates calculated using the obtained camera parameters, Mi is the circle center coordinates of the corresponding concentric circle groups in the calibration plate, A is the intrinsic parameter matrix, B is the extrinsic parameter matrix, and $k_1$, $k_2$, $p_1$, $p_2$ are distortion parameters. Subsequently, the Levenberg-Marquardt algorithm can be used to obtain the optimal solutions of the camera parameters with the principle of minimum re-projection error (i.e., the objective function is minimal).

The optimal solutions of the camera parameters obtained by the above optimization process can be marked as the current camera parameter calibration values. Then, whether further optimization is performed is determined according to whether the current parameter calibration values satisfy the accuracy requirement.

S722, a correction step: correcting the calibration image according to the current camera parameter calibration value.

In general, a wide-angle camera lens can produce images quickly due to the use of a lens, but at the expense of introducing distortion. The calibration image is therefore typically a distorted image that can be corrected by a common distortion correction method. For example, the distortion image can be corrected by the following formula:

$$x'=x(1+k_1 r^2+k_2 r^4)+[2p_1 y+p_2(r^2+2x^2)]$$

$$y'=y(1+k_1 r^2+k_2 r^4)+[2p_2 x+p_1(r^2+2y^2)],$$

where (x, y) is the original position coordinate of the distortion point on the imager, r is the distance from the point to the center of the imager, and (x', y') is the corrected position coordinate, and $k_1$, $k_2$, $p_1$, $p_2$ are the distortion parameters.

Through the correction process, the original calibration image with the distortion can be converted into an undistorted image of the calibration plate. It should be noted that the corrected calibration image is not necessarily a strictly undistorted image due to the detection error and the calculation error.

S723, a detection step: detecting, in the corrected calibration image, a solid circle corresponding to a solid circle center point in the camera calibration plate by using a standard circle detection algorithm to obtain a circle center coordinate of the solid circle.

After the correction step, as shown in FIG. 2a, a plurality of solid circles in one-to-one correspondence with the plurality of solid circle center points 203 in the calibration plate 200 in the corrected image may be detected by a standard circle detection algorithm to obtain the circle center coordinates of these solid circles. The standard circle detection algorithm can employ an algorithm in the related art, such as Hough detection, or the like.

S724, a projection step: projecting a plurality of solid circles onto the calibration image according to an anti-distortion projection relationship to obtain a plurality of solid ellipses, and calculating center point coordinates of the plurality of solid ellipses according to circle center coordinates of the plurality of solid circles.

After acquiring the circle center coordinates of the solid circles in the corrected image (undistorted image), they can be projected into the original calibration image 210 (distorted image) as shown in FIG. 2b. Then, the center point coordinates of the patterns projected into the calibration image 210 (i.e., the solid ellipses) are calculated from the circle center coordinates of the undistorted image and the corresponding calibration parameters.

S725, a distance calculation step: calculating a sum of squares of distances between center points of the plurality of solid ellipses and a center point of a corresponding concentric ellipse group in the calibration image.

In step S725, the distances between the center point of each projected solid ellipse and the center point of the corresponding concentric ellipse group 212 detected in the original calibration image 210 shown in FIG. 2b are calculated, and then the sum of the squares of these distances is calculated, thereby knowing the degree of proximity between the center point of the projection pattern calculated by the current parameter calibration value and the center point of the actually detected concentric ellipse group 212, and thus characterizing the accuracy of the parameter calibration. Then, according to the degree of proximity, it can be determined whether the current parameter calibration value meets the accuracy requirement.

S726, a determination step: determining whether the sum of squares is greater than a first threshold, and if yes, going to S727, otherwise going to S728.

In order to determine whether the current parameter calibration value meets the accuracy requirement, that is, whether the obtained sum of squares of the distances is small enough to achieve an acceptable accuracy requirement, the first threshold value needs to be set. When the sum of squares is greater than the first threshold, it indicates that the calculated center point coordinate largely deviates from the actual coordinate, that is, the error is large, and the accuracy requirement is not met, and the further iterative optimization is needed. When the sum of squares is less than or equal to the first threshold, it indicates that the error is small and the current parameter calibration value meets the accuracy requirement. At this time, the current parameter calibration value can be regarded as the final calibration value. For specific procedures, see steps S727 and S72.

S727, a loop optimization step: in response to the fact that the sum of squares is greater than a first threshold, setting a current camera parameter calibration value as the camera parameter initial value, and then going to S721 to restart the optimization process.

S728, a calibration completion step: in response to the fact that the sum of squares is not greater than the first threshold, setting the current camera parameter calibration value as a final calibration value of the camera parameter, and ending the optimization process.

Optionally, in the iterative optimization process, in addition to setting the ending condition according to whether the accuracy requirement is met, the iteration ending condition may be defined by setting the maximum iterative optimization number. In this way, the accuracy requirement and the calculation amount can be taken into consideration, which avoids too much computation caused by too many iterative optimization times, to reduce the burden on computing devices.

As shown in FIG. 7, the optimization step S320 shown in FIG. 3 may further comprise: S729, an additional determination step of determining whether a number of iterative optimization times is less than a second threshold; and simultaneously the step S727 further comprises: in response to the fact that the sum of squares is greater than the first threshold and the number of iterative optimization times is less than the second threshold, setting the current camera parameter calibration value as the camera parameter initial value, and then going to the step S721 to restart the optimization process; and the step S728 further comprises: in response to the fact that the sum of squares is not greater than the first threshold and the number of iterative optimization times is not less than the second threshold, setting the current camera parameter calibration value as the final calibration value of the camera parameter and ending the optimization process.

In step S729, the second threshold represents the maximum number of iterative optimization times. The maximum number of iterative optimization times can be set in advance based on the performance of the computing device. The number of iterative optimization times refers to the number of times the optimization step S721 is performed, and can be calculated by the accumulation method. For example, before the start of the method, the number of iterative optimization times k is set as follows: k=0. After step S721 is completed, k=k+1. In this way, the cumulative optimization times after each execution of the optimization step S721 can be obtained.

FIG. 8 illustrates a camera calibration device in accordance with some embodiments of the present disclosure. A camera calibration method according to some embodiments of the present invention may be accomplished by a camera calibration device similar to that shown in FIG. 8. As shown in FIG. 8, the camera parameter calibration device 800 can comprise:

an initialization means 801 configured to determine an initial value of a camera parameter using a camera calibration plate according to some embodiments of the present disclosure, wherein the camera parameter comprises a camera intrinsic parameter, a camera extrinsic parameter, and a camera distortion parameter; and an optimization means 802 configured to optimize the initial value of the camera parameter in an iterative manner.

In some embodiments, the initialization means 801 and the optimization means 802 in the camera calibration device 800 shown in FIG. 8 may comprise separate hardware, software, firmware, or a combination thereof that implement the corresponding functions, for example, processor, microcontroller, and chip with data transceiving and processing capabilities, discrete logic circuits with logic gate circuits that implement logic functions on data signals, Application Specific Integrated Circuits (ASICs) with suitable combinational logic gate circuits, Programmable Gate Array, Field Programmable Gate Array, or the like, or a combination of any two or more of the above hardwares.

Specifically, the specific hardware configuration of the camera calibration device according to some embodiments of the present disclosure may comprise: a SOC motherboard, a power board, and an information transceiver (e.g., a WIFI antenna). The SOC motherboard is used as the aforementioned processor for data processing and performing corresponding camera parameter calibration steps (such as initialization and optimization steps); the information transceiver is used for data communication with the camera to be calibrated; and the power board is used for powering each component. Of course, the human-machine interaction device according to the present disclosure is not limited to the above structure.

Compared with the related art, the beneficial effects of the camera calibration device provided by the embodiments of the present disclosure are the same as those of the camera calibration method described above, and are not described herein.

Embodiments of the present disclosure also provide an image acquisition system that comprises the camera calibration device in accordance with some embodiments of the present disclosure. For example, the image acquisition system may comprise, but are not limited to, fisheye cameras, wide-angle cameras, wide-angle video cameras, and the like.

The various embodiments in the specification are described in a progressive manner, and the same or similar parts between the various embodiments may be referred to each other, and each embodiment focuses on the differences from the other embodiments. In particular, for the device embodiment, since it is basically similar to the method embodiment, the description is relatively simple, and the relevant parts can refer to the description of the method embodiment.

While particular embodiments of the present disclosure has been shown and described, it will be apparent to those skilled in the art that, a number of changes and modifications can be made in its broader aspects without departing from the disclosure. Therefore, the appended claims shall comprise all such changes and modifications within their scopes, as falling within the true spirit and scope of this disclosure.

In the description of the present specification, the descriptions of the terms "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Any process or method description in the flowcharts or otherwise described herein can be understood to represent a module, segment or portion of code comprising one or more executable instructions for implementing the steps of a custom logic function or process. And the scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

The terms "component", "means", "module", "device", and the like, when used in this specification, may generally mean a computer-related entity, hardware, or a combination of hardware and software, software, or software executed, unless the context clearly states otherwise. For example, such components can be, but are not limited to, processes running on a processor, a processor, an object, an executable file, an execution thread, a program, and/or a computer. For example, both an application running on a controller and a controller can be a component. One or more components can reside within a process and/or execution thread, and the components can be located on a single computer (device) and/or distributed between two or more computers (devices).

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that, in the claims, the term "comprising/including" and the variants thereof does not exclude the presence of other elements or steps that are not stated in the claims; The wording "a" or "an" does not exclude a plurality.

The invention claimed is:

1. A camera calibration method comprising:
 an initialization step of determining an initial value of a camera parameter using a camera calibration plate, the camera calibration plate comprising a planar plate body and a plurality of groups of concentric circles on the planar plate body, wherein the plurality of groups of concentric circles are same and comprise solid circle center points, and wherein the plurality of groups of concentric circles are distributed in an array; and
 an optimization step of optimizing the initial value of the camera parameter in an iterative manner,
 wherein the initialization step comprises:
 a calibration image acquisition step of acquiring a calibration image of the camera calibration plate captured by a camera, the calibration image comprising a plurality of groups of elliptical patterns and solid center points of the plurality of groups of elliptical patterns corresponding to the plurality of groups of concentric circles in the camera calibration plate and solid circle center points of the plurality of groups of concentric circles;
 an ellipse detection step of extracting in the calibration image, by using an ellipse detection algorithm, a plurality of ellipses respectively corresponding to concentric circles of the plurality of groups of concentric circles of the camera calibration plate, and acquiring parameter information for the plurality of ellipses;
 an ellipse grouping step of dividing the plurality of ellipses into a plurality of concentric ellipse groups respectively corresponding to the plurality of groups of concentric circles of the camera calibration plate according to the parameter information for the plurality of ellipses;
 a parameter calculation step of calculating parameter information for the plurality of concentric ellipse groups according to respective parameter information of each ellipse in each concentric ellipse group; and
 an initial value determination step of determining an initial value of an intrinsic parameter and an initial value of an extrinsic parameter of the camera according to the parameter information for the plurality of concentric ellipse groups, wherein the intrinsic parameter of the camera comprises principal point pixel coordinates of the camera and normalized focal lengths of the camera on abscissa and ordinate axes in a pixel coordinate system respectively.

2. The camera calibration method of claim 1, wherein the parameter information for the plurality of ellipses comprises a rotation angle and a center point pixel coordinate of each of the plurality of ellipses.

3. The camera calibration method of claim 1, wherein the ellipse grouping step comprises steps of:
 a) acquiring M groups of the plurality of groups of concentric circles of the camera calibration plate and a number N of concentric circles in each of the plurality of groups of concentric circles, equating a current number k of groups of the plurality of ellipses to zero, and putting the plurality of ellipses into an ungrouped ellipse set;
 b) randomly selecting an ellipse from the ungrouped ellipse set, and calculating a distance between a center point of the ellipse that was selected and a center point of each of other ellipses in the ungrouped ellipse set;
 c) sorting the other ellipses in order from shortest to largest distance between the center point of the each of the other ellipses and the center point of the ellipse that was selected, dividing N−1 of the other ellipses that were sorted and the ellipse that was selected into a group, removing the group from the ungrouped ellipse set, and equating the current number k of groups to k+1;
 d) determining whether the current number k of groups is less than the M groups;
 e) in response to the current number k of groups being less than the M groups, determining whether the ungrouped ellipse set is empty; if the ungrouped ellipse set is not empty, performing step b), otherwise performing to step f); and
 f) in response to the current number k of groups being not less than the M groups or the ungrouped ellipse set being empty, ending the ellipse grouping step.

4. The camera calibration method of claim 2, wherein the parameter calculation step comprises:
 calculating a center point pixel coordinate of each concentric ellipse group of the plurality of concentric ellipse groups according to the center point pixel coordinate of each of the plurality of ellipses thereof;
 calculating an average rotation angle of each concentric ellipse group of the plurality of concentric ellipse groups according to the rotation angle of each of the plurality of ellipses thereof; and
 calculating a short axis equation for each concentric ellipse group of the plurality of concentric ellipse groups according to the average rotation angle thereof.

5. The camera calibration method of claim 4, wherein the initial value determination step comprises:

combining the short axis equation of the each concentric ellipse group to form a system of equations, finding a approximate solution of the system of equations by a least squares method, and taking the approximate solution that was found as an initial value of a principal point pixel coordinate among the principal point pixel coordinates of the camera.

6. The camera calibration method of claim 5, wherein the initial value determination step further comprises:

calculating a homography matrix according to world coordinates of circle centers of the plurality of groups of concentric circles in the camera calibration plate and the center point pixel coordinate of a corresponding one of the plurality of concentric ellipse groups in the calibration image;

calculating a intrinsic parameter matrix of the camera according to the homography matrix and the initial value of the principal point pixel coordinate of the camera; and calculating the initial value of the extrinsic parameter of the camera according to the homography matrix and the intrinsic parameter matrix of the camera.

7. The camera calibration method of claim 6, wherein the initial value determination step further comprises:

calculating initial values of the normalized focal lengths of the camera on the abscissa and ordinate axes in the pixel coordinate system respectively, according to the intrinsic parameter matrix of the camera and the initial value of the extrinsic parameter of the camera.

8. The camera calibration method of claim 7, wherein the initialization step further comprises:

setting an initial value of distortion parameters of the camera to zero, wherein the distortion parameters comprise a radial distortion parameter and a tangential distortion parameter.

9. The camera calibration method of claim 8, wherein the optimization step comprises:

a nonlinear optimization step of nonlinearly optimizing, by using an iterative optimization algorithm, the initial value of the camera parameter to obtain a current camera parameter calibration value;

a correction step of correcting the calibration image according to the current camera parameter calibration value;

a detection step of detecting, in the calibration image that was corrected, solid circles corresponding to the solid circle center points of the camera calibration plate by using a standard circle detection algorithm to obtain a circle center coordinate of each of the solid circles;

a projection step of projecting the solid circles onto the calibration image according to an anti-distortion projection relationship to obtain a plurality of solid ellipses, and calculating center point coordinates of the plurality of solid ellipses according to the circle center coordinates of the solid circles;

a distance calculation step of calculating a sum of squares of distances between center points of the plurality of solid ellipses and a center point of a corresponding concentric ellipse group of the plurality of concentric ellipse groups in the calibration image;

a determination step of determining whether the sum of squares is greater than a first threshold;

a loop optimization step of, in response to the sum of squares being greater than the first threshold, setting the current camera parameter calibration value as the initial value of the camera parameter, and performing the nonlinear optimization step; and a calibration completion step of, in response to the sum of squares not being greater than the first threshold, setting the current camera parameter calibration value as a final calibration value of the camera parameter.

10. The camera calibration method of claim 9, wherein the optimization step further comprises a further determination step of determining whether a number of times the nonlinear optimization step was performed is less than a second threshold;

the loop optimization step comprises, in response to the sum of squares being greater than the first threshold and the number of times being less than the second threshold, setting the current camera parameter calibration value as the initial value of the camera parameter, and performing the nonlinear optimization step; and the calibration completion step comprises, in response to the sum of squares not being greater than the first threshold and the number of times not being less than the second threshold, setting the current camera parameter calibration value as the final calibration value of the camera parameter.

11. The camera calibration method of claim 9, wherein the iterative optimization algorithm comprises a nonlinear least squares algorithm, a neural network algorithm, or a genetic algorithm.

12. The camera calibration method of claim 11, wherein the nonlinear least squares algorithm comprises a Levinberg-Marquardt algorithm, a steepest descent algorithm, or a Gauss-Newton algorithm.

13. A non-transitory computer readable storage medium having stored thereon computer readable instructions that, when executed, perform the camera calibration method of claim 1.

14. The camera calibration method according to claim 1, wherein the plurality of groups of concentric circles are arranged at a fixed distance between the solid circle center points thereof.

15. A camera calibration device comprising:

an initialization processor, configured to determine an initial value of a camera parameter using a camera calibration plate, the camera calibration plate comprising a planar plate body and a plurality of groups of concentric circles on the planar plate body, wherein the plurality of groups of concentric circles are same and comprise solid circle center points, and wherein the plurality of groups of concentric circles are distributed in an array; and an optimization processor, configured to optimize the initial value of the camera parameter in an iterative manner, wherein the initialization processor comprises:

a calibration image acquisition processor, configured to acquire a calibration image of the camera calibration plate captured by a camera, the calibration image comprising a plurality of groups of elliptical patterns and solid center points of the plurality of groups of elliptical patterns corresponding to the plurality of groups of concentric circles in the camera calibration plate and solid circle center points of the plurality of groups of concentric circles;

an ellipse detection processor, configured to extract in the calibration image, by using an ellipse detection algorithm, a plurality of ellipses respectively corresponding to concentric circles of the plurality of groups of concentric circles of the camera calibration plate, and acquire parameter information for the plurality of ellipses;

an ellipse grouping processor, configured to divide the plurality of ellipses into a plurality of concentric ellipse groups respectively corresponding to the plurality of groups of concentric circles of the camera calibration plate according to the parameter information for the plurality of ellipses;

a parameter calculation processor, configured to calculate parameter information for the plurality of concentric ellipse groups according to respective parameter information of each ellipse in each concentric ellipse group; and an initial value determination processor, configured to determine an initial value of an intrinsic parameter and an initial value of an extrinsic parameter of the camera according to the parameter information for the plurality of concentric ellipse groups, wherein the intrinsic parameter of the camera comprises principal point pixel coordinates of the camera and normalized focal lengths of the camera on abscissa and ordinate axes in a pixel coordinate system respectively.

16. An image acquisition system comprising the camera calibration device of claim 15.

* * * * *